US011247603B2

(12) United States Patent
Ramesh Ahuja et al.

(10) Patent No.: US 11,247,603 B2
(45) Date of Patent: Feb. 15, 2022

(54) AUTOMOBILE HEADLIGHT ASSEMBLY

(71) Applicant: Varroc Engineering Private Limited, Pune (IN)

(72) Inventors: Lalit Ramesh Ahuja, Pune (IN); Aditi Vijay Nerurkar, Pune (IN); Balasaheb Ramrao Khadke, Pune (IN)

(73) Assignee: VARROC ENGINEERING LIMITED, Pune (IN)

( * ) Notice: Subject to any disclaimer, the term of this patent is extended or adjusted under 35 U.S.C. 154(b) by 0 days.

(21) Appl. No.: 16/966,878

(22) PCT Filed: Feb. 1, 2019

(86) PCT No.: PCT/IN2019/050074
§ 371 (c)(1),
(2) Date: Jul. 31, 2020

(87) PCT Pub. No.: WO2019/150391
PCT Pub. Date: Aug. 8, 2019

(65) Prior Publication Data
US 2021/0039549 A1 Feb. 11, 2021

(30) Foreign Application Priority Data
Feb. 2, 2018 (IN) .............................. 201821004044

(51) Int. Cl.
*B60Q 1/14* (2006.01)
*F21S 41/663* (2018.01)

(52) U.S. Cl.
CPC ............ *B60Q 1/143* (2013.01); *F21S 41/663* (2018.01); *B60Q 2300/42* (2013.01)

(58) Field of Classification Search
None
See application file for complete search history.

(56) References Cited

U.S. PATENT DOCUMENTS 6,861,809 B2    3/2005   Stam
6,908,207 B2    6/2005   Jeannot
(Continued)

FOREIGN PATENT DOCUMENTS

CN      102009614 A1    4/2011
DE      102005017933 A1  10/2006
WO      2015038348        3/2015

OTHER PUBLICATIONS

International Search Report for PCT/IN2019/050080 prepared by the Indian Patent Office and dated Mar. 26, 2019.
(Continued)

*Primary Examiner* — Anh Q Tran
(74) *Attorney, Agent, or Firm* — Shumaker, Loop & Kendrick, LLP

(57) ABSTRACT

A headlight assembly for an automobile comprising a left region and a right region, the headlight assembly being configured to reduce an intensity of a light beam when an oncoming automobile is detected, is described. The headlight assembly includes, at least one light source, at least one light detector configured to detect the oncoming automobile and generate a signal, and a control module configured to receive the signal from the light detector, and reduce the intensity of the light beam. A method for reducing the intensity of a light beam of a headlight assembly for an automobile when an oncoming automobile is detected, is also described.

7 Claims, 3 Drawing Sheets

(56) References Cited

U.S. PATENT DOCUMENTS

| | | |
|---|---|---|
| 7,241,034 B2 | 7/2007 | Smith et al. |
| 8,203,443 B2 * | 6/2012 | Bos .................. H04N 13/239 340/461 |
| 8,987,991 B2 | 3/2015 | Ikeda et al. |
| 2003/0137849 A1 * | 7/2003 | Alden .................. F21S 41/148 362/466 |
| 2010/0213846 A1 * | 8/2010 | Thomas ............... B60Q 1/1423 315/82 |
| 2013/0148369 A1 | 6/2013 | Haest |
| 2013/0148396 A1 | 6/2013 | Walters |
| 2015/0028741 A1 | 1/2015 | Schmidt et al. |
| 2015/0042225 A1 * | 2/2015 | Fukayama ............. B60Q 1/143 315/82 |
| 2015/0081168 A1 | 3/2015 | McWithey et al. |

OTHER PUBLICATIONS

Written Opinion for PCT/IN2019/050080 prepared by the Indian Patent Office and dated Mar. 26, 2019.
International Search Report for PCT/IN2019/050074 prepared by the Indian Patent Office and dated Apr. 15, 2019.
Written Opinion for PCT/IN2019/050074 prepared by the Indian Patent Office and dated Apr. 15, 2019.

* cited by examiner

AUTOMOBILE HEADLIGHT ASSEMBLY

CROSS-REFERENCE TO RELATED APPLICATIONS

This application claims priority to provisional application IN201821004044 dated 2 Feb. 2018, which is hereby incorporated by reference in its entirety.

BACKGROUND OF THE INVENTION

1. Field of the Invention

The present invention relates to headlights for automobiles. More specifically, the invention relates to headlights for automobiles that reduce the intensity of the light beam when an oncoming automobile is detected.

2. Discussion of the Related Art

Headlight assemblies for automobiles are generally designed to operate in two modes: a "low-beam" mode, wherein the intensity of the light from the headlight is low, and thus provides lesser illumination, as well as lights up a smaller area in front of the automobile; and a "high beam" mode, wherein the intensity of light from the headlight is high, and thus provides more illumination and lights up a larger area in front of the automobile. The "high-beam" mode may be generated by either increasing the intensity of the headlight, or by switching on an additional light source in the headlight to generate a higher light intensity. One of the issues with the use of the "high-beam" mode is that the rider of an oncoming automobile is often blinded by the high intensity light of the headlight in "high-beam" mode, thus increasing the risk of an accident.

Prior art description US20150028741 describes a driver assistance system which automatically controls the high and low beam of the headlamp of an automobile. The system includes a camera, and an image evaluation unit to detect the presence of an oncoming vehicle, and switch the headlight from high-beam to low beam. CN102009614A describes a system for switching between high and low beam modes of a headlight, specifically for a car. This system includes an infrared transmitter, and infrared detectors positioned near the headlight assembly. The detectors detect infrared rays emitted by an oncoming vehicle, and switch from high beam to low bema mode. DE102005017933 describes a unit for automatically switching on and off high beams. The system includes a photo-voltaic cell to detect light from an oncoming vehicle, and a control unit to automatically switch the beam from high beam to low beam when the headlight from an oncoming vehicle is detected by the photo-voltaic cell.

Therefore, there is a need in the art for a robust and inexpensive system, to switch automatically the headlight beam from high-beam to low beam when an oncoming vehicle is detected. There also exists a need to have the size of these systems to enable them to be incorporated into a headlight assembly of automobiles such as of a two wheeled automobile without compromising on the efficiency of the system.

SUMMARY OF THE INVENTION

One embodiment of the present invention describes a headlight assembly for an automobile including a left region and a right region, the headlight assembly being configured to reduce an intensity of a light beam when an oncoming automobile is detected. The headlight assembly further includes at least one light source; at least one light detector configured to detect the oncoming automobile and generate a signal; a control module configured to receive the signal from the at least one light detector, and reduce the intensity of the light beam.

Another embodiment of the present invention is a method for reducing an intensity of a light beam of a headlight assembly for an automobile comprising a left region and a right region, the headlight assembly being configured to reduce the intensity of the light beam when an oncoming automobile is detected. The headlight assembly includes at least one light source; at least one light detector configured to detect the oncoming automobile and generate a signal; a control module configured to receive the signal from the at least one light detector and reduce the intensity of the light beam. The method includes the steps of, detecting the oncoming automobile; generating a signal by the at least one light detector; receiving at the control module, the signal generated by the at least one light detector; conditioning the signal to produce a conditioned signal; and, transmitting the conditioned signal to the at least one light source to reduce the intensity of light beam.

DETAILED DESCRIPTION OF THE INVENTION

While various embodiments of the invention have been shown and described herein, it will be obvious to those skilled in the art that such embodiments are provided by way of example only. Numerous variations, changes, and substitutions may occur to those skilled in the art without departing from the invention. It should be understood that various alternatives to the embodiments of the invention described herein may be employed.

In the specification and the claims which follow, reference will be made to a number of terms which shall be defined to have the following meanings:

The singular forms "a", "an" and "the" include plural referents unless the context clearly dictates otherwise. "Optional" or "optionally" means that the subsequently described event or circumstance may or may not occur, and that the description includes instances where the event occurs and instances where it does not. "Substantially" means a range of values that is known in the art to refer to a range of values that are close to, but not necessarily equal to a certain value.

As used herein the term "automobile" is defined as a system for transporting people, animals or cargo by road. The term is intended to include, but not be limited to, motorized and non-motorized transportation systems, and is also intended to include automobiles with two, three, or more wheels. Non-limiting examples of such automobiles may include bicycles, motorcycles, scooters, and the like.

One embodiment of the present invention describes a headlight assembly for an automobile comprising a left region and a right region, the headlight assembly being configured to reduce an intensity of a light beam when an oncoming automobile is detected. The headlight assembly includes at least one light source; at least one light detector configured to detect the oncoming automobile and generate a signal; a control module configured to receive the signal from the at least one light detector; and reduce the intensity of the light beam.

Figure 1:
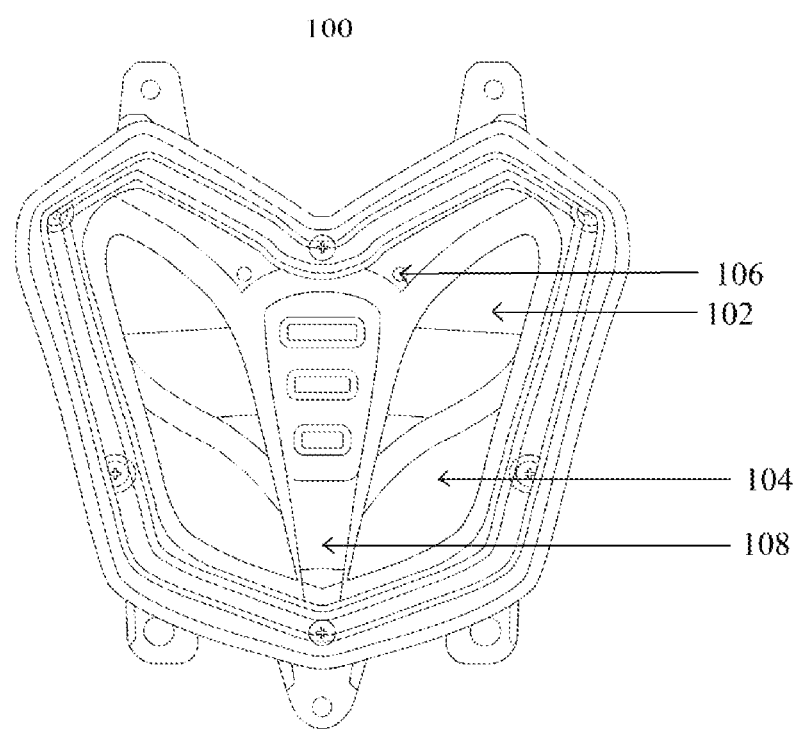
FIG. 1 is a schematic representation of a headlight assembly for an automobile according to an embodiment of the invention.

Referring now to FIG. 1, a headlight assembly according to an embodiment of the present invention is shown. Headlight assembly 100 includes a high beam light source 102, a low beam light source 104, light detector 106 and control unit 108. When the headlight is in low beam mode, only the low beam light source 104 is actuated, and when the headlight is in a high-beam mode, both the low beam light source 104 and the high-beam light source 102 are actuated. The light detector is configured to detect light of an oncoming automobile and produce a signal. This signal is received by the control unit 108, which in turn conditions the signal to produce a conditioned signal. This conditioned signal is transmitted to the light source (102) to switch off the high-beam mode, thus reducing the intensity of the light from the headlight assembly 100.

Non-limiting examples of the high-beam light sources 102 and low-beam light sources 104 may be incandescent bulbs, fluorescent bulbs, light emitting diodes, and the like. In an embodiment of the present invention, the headlight assembly includes at least two high beam light sources 102. In another embodiment of the present invention, the headlight assembly includes at least two low beam light sources 104. In yet another embodiment of the present invention, the headlight assembly includes at least two high beam light sources 102 and at least two low beam light sources 104. In an embodiment of the present invention, the high-beam light source 102 can be a light emitting diode. In another embodiment of the present invention, the low-beam light source 104 can be a light emitting diode. In yet another embodiment of the present invention, the high-beam light source 102 and the low-beam light source 104 can be a light emitting diode.

In an embodiment of the invention, the headlight assembly incudes at least two light detectors 106. In one embodiment of the present invention, the light detectors 106 may be placed at the proximity of the light source. In another embodiment of the present invention, the light detectors 106 may be placed at the outer side of the high-beam light source 102. In another embodiment of the present invention, the light detectors 106 may be placed at the outer side of the low-beam light source 104. In yet another embodiment of the present invention, the headlight assembly incudes at least two light detectors placed at the left region and the right region of the headlight assembly. In an embodiment of the present invention, the headlight assembly incudes two light detectors, placed at the left region and the right region of the headlight assembly, to detect whether the oncoming automobile is approaching from the left side or the right side of the automobile.

In an embodiment of the invention, the control unit 108 is a microcontroller. In an embodiment of the invention, the control unit 108 is a light emitting diode driver module (LDM).

Another embodiment of the present invention is a method for reducing an intensity of a light beam of a headlight assembly for an automobile comprising a left region and a right region the headlight assembly being configured to reduce the intensity of a light beam when an oncoming automobile is detected. The headlight assembly includes at least one light source; at least one light detector configured to detect the oncoming automobile and generate a signal; a control module configured to receive the signal from the light detector, and reduce the intensity of the light beam. The method includes the steps of, detecting the oncoming automobile; generating a signal by the at least one light detector; receiving, at the control module, the signal generated by the at least one light detector; conditioning the signal to produce a conditioned signal; and transmitting the conditioned signal to the at least one light source to reduce the intensity of the light beam.

In an embodiment of the present invention, the step of reducing the intensity of the light beam is carried out by switching off the high-beam light source. In an embodiment of the present invention, the step of reducing the intensity of the light beam is carried out by switching off the high-beam light source on the side from which the oncoming vehicle is detected.

Figure 2:
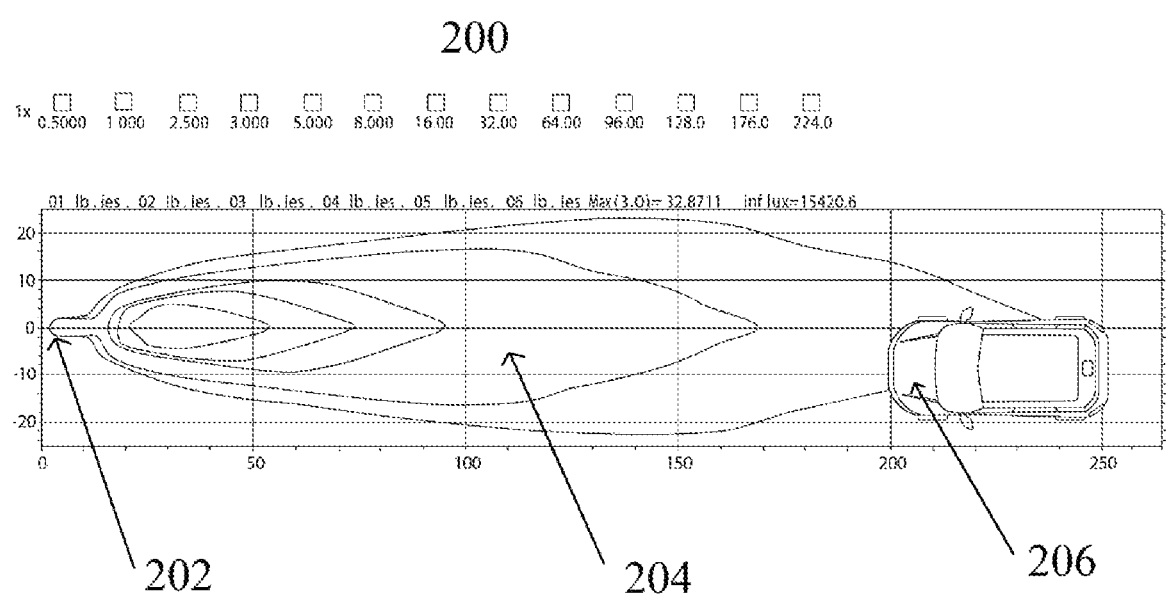
FIG. 2 is a representation of the beam spread of a prior art headlight assembly for an automobile.

Referring now to FIG. 2, the beam spread (200) of a prior art headlight assembly 202 is shown. It can be seen that the headlight beam (204) falls directly on to an oncoming automobile (206). There is a possibility that the light beam will blind the driver of the oncoming vehicle, thus increasing the probability of an accident.

Figure 3:
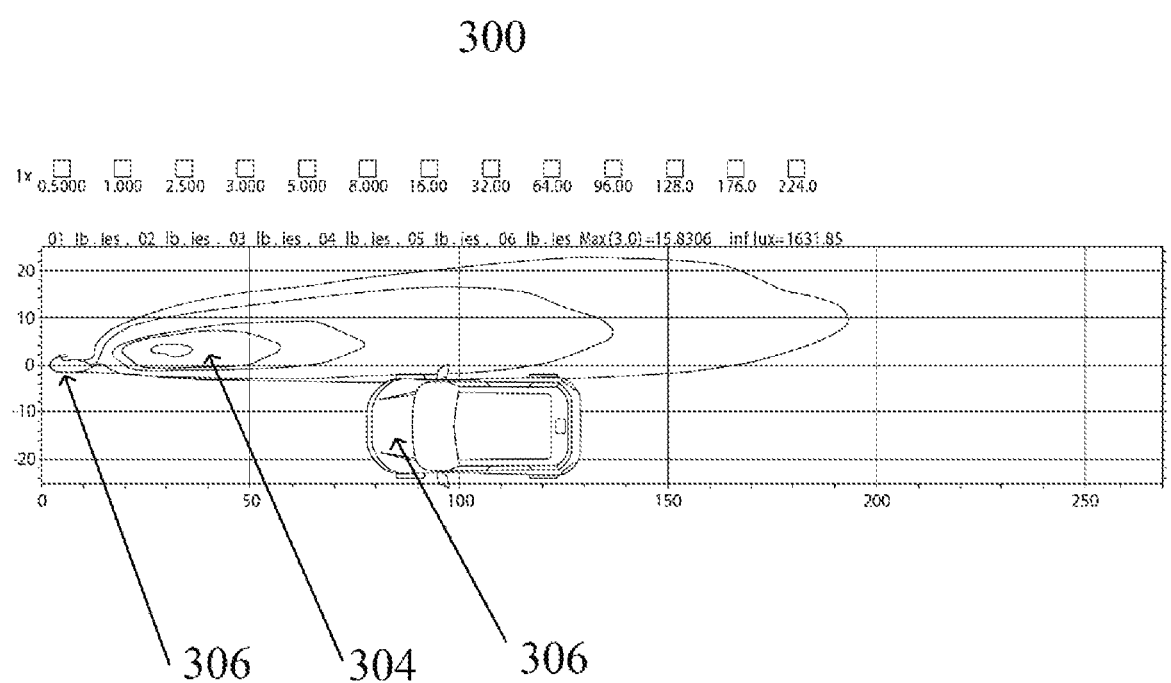
FIG. 3 is a representation of the beam spread of a headlight assembly for an automobile according to an embodiment of the invention.

Referring now to FIG. 3, the beam spread (300) of a headlight assembly 302 according to an embodiment of the invention is shown. Here, when the oncoming automobile (306) is detected, the headlight is switched to low-beam mode, and the light from the headlight or the headlight beam (304) does not fall directly on the driver of the oncoming automobile, thus reducing the chances of blinding the driver, and causing an accident. The oncoming automobile (304) approaches from the right of the automobile, hence is detected by the detector on the right region of the headlight assembly, and the light source corresponding to the right side of the automobile is switched from high beam to low beam.

We claim:

1. A headlight assembly for an automobile comprising a left region and a right region, the headlight assembly being configured to reduce an intensity of a light beam when an oncoming automobile is detected, comprising:
    at least two high beam sources;
    at least two low beam sources;
    at least two light detectors configured to detect the oncoming automobile and generate a signal, wherein each of the light detector is mapped to a respective high beam source;
    a control module configured to receive the signal from the at least one light detector, and reduce the intensity of the light beam by changing beam spread, wherein to change the beam spread, the control module is configured to selectively switch off at least one high beam light source corresponding to the at least one light detector from which the oncoming vehicle is detected.

2. The headlight assembly of claim 1, further comprising at least two light sources positioned at the left region and right region of the headlight assembly.

3. The headlight assembly of claim 1, wherein the at least two light detectors is positioned in the left and right regions of the headlight assembly.

4. A method for reducing an intensity of a light beam of a headlight assembly for an automobile, the method comprising the steps of:
    detecting, by at least one light detector, an oncoming automobile;
    generating a signal by the at least one light detector;

receiving, at a control module, the signal generated by the at least one light detector;

conditioning, by the control module, the signal to produce a conditioned signal;

transmitting, by the control module, the conditioned signal to at least one light source, wherein each of the light detector is mapped to a respective light source; and reducing the intensity of the light beam by changing beam spread, wherein changing the beam spread comprises selectively switching off at least one light source corresponding to the at least one light detector from which the oncoming vehicle is detected.

5. The method of claim 4, wherein detecting the oncoming automobile is carried out by means of at least two light detectors positioned at the left and right regions of the headlight assembly.

6. The method of claim 4, wherein selectively switching off the at least one light source comprises selectively switching off at least one high beam source.

7. A headlight assembly for an automobile comprising a left region and a right region, the headlight assembly being configured to reduce an intensity of a light beam when an oncoming automobile is detected, comprising:

at least two light sources;

at least two light detectors configured to detect an oncoming automobile and generate a signal, wherein each of the light detector is mapped to a respective light source;

a control module configured to receive the signal from the at least two light detectors, and reduce the intensity of the light beam by changing beam spread, wherein to change the beam spread, the control module is configured to selectively switch off at least one light source corresponding to the at least one light detector from which the oncoming vehicle is detected.

* * * * *